Dec. 9, 1930.    H. F. J. BERNAERTS    1,784,128
SHOCK REDUCER FOR VEHICLES PROVIDED WITH LEAF SPRINGS
Filed Oct. 23, 1928
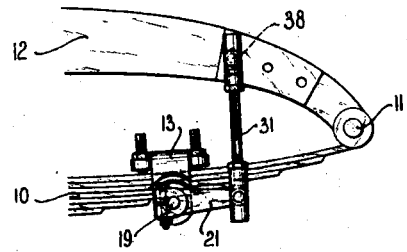
Fig.1.
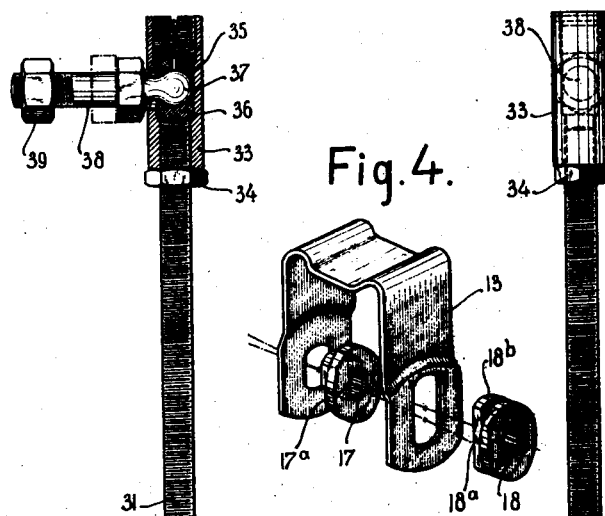
Fig.2.    Fig.3.
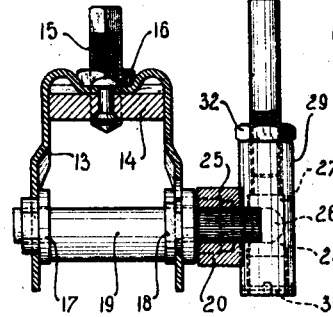
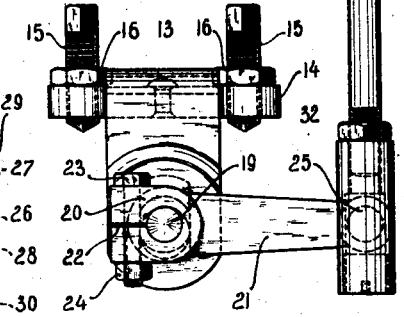
INVENTOR
Henricus Franciscus Jozef Bernaerts
by
ATTORNEY Patented Dec. 9, 1930

1,784,128

UNITED STATES PATENT OFFICE

HENRICUS FRANCISCUS JOZEF BERNAERTS, OF ZEIST, NETHERLANDS, ASSIGNOR TO NAAMLOOZE VENNOOTSCHAP TECHNISCH- EN HANDELSBUREAU VAN VLIET EN ZONEN, OF BUSSUM, NETHERLANDS

SHOCK REDUCER FOR VEHICLES PROVIDED WITH LEAF SPRINGS

Application filed October 23, 1928, Serial No. 314,342, and in the Netherlands August 3, 1928.

My present invention, which relates to a shock reducer or absorber of the type comprising means for increasing the friction between the leaves of a leaf spring so as to reduce or damp vertical oscillation, has for its principal object a device of this character which is of simple and reliable construction and particularly effective in operation. With this object in view I suggest to use a strap adapted to embrace the leaf spring and provided with a pivoted locking member having an eccentric portion, said locking member being adapted to be rotated and thereby exert a powerful clamping action on the spring leaves through mechanism that is positively actuated when the spring flexes inward or outward.

In order that my invention may be fully understood, I shall now proceed to describe in detail a preferred embodiment thereof, reference being had to the annexed drawing, on which Fig. 1 is a side elevational view of a leaf spring of a vehicle provided with my novel shock absorber, Fig. 2 is a front view of said absorber, certain parts of which are shown in vertical section, Fig. 3 is a side elevation of said absorber, Fig. 4 is a perspective view of certain detached parts.

The leaf spring 10, which is the front longitudinal spring of an automobile, is hinged as at 11 to the spring carrier arm 12. A strap 13 bent from a spring leaf and straddling the said spring 10 has riveted to the inner face of its central or bridge portion a rigid clamping piece 14, which projects on both sides of the strap.

Each projecting end portion of said clamping piece is provided with a threaded hole for receiving a set screw 15 having a hardened center point adapted to engage the top face of the upper leaf of spring 10, and also a nut 16 by means of which the screw can be locked in position.

Each of the depending shanks of the strap 13 has an aperture for receiving bearing bushes 17 and 18, respectively for the trunnions of a locking member 19 adapted to engage the lower face of the lowermost leaves of spring 10. The central portion of said locking member 19, i. e. the portion located between the inner faces of the bearing bushes 17 and 18, is eccentric. The right hand trunnion of the locking member 19 projects from the bearing bush 18 and is provided with axial grooves corresponding with axial ribs on the wall of a cylindrical hole in the hub portion 20 of a lever 21. Said hub portion is split as at 22, so that it can freely be slid over the grooved end portion of the right hand trunnion of the locking member 19 and thereafter be clamped on said trunnion by means of a screw bolt 23 and a nut 24.

Secured to the free end of lever 21 is a laterally extending stud 25 provided with a spherical head 26 engaged between two bearings 27 and 28 located in a substantially vertical sleeve 29 and held in engagement with the head 26 by means of a screw 30 entering said sleeve 29 from below. The lower threaded end of a substantially vertical rod 31 is screwed into the upper portion of the sleeve 29 and held in engagement therewith by means of a nut 32, the upper threaded end of rod 31 being screwed into the lower portion of a second sleeve 33 and held in engagement therewith by a nut 34.

The sleeve 33 is provided with two bearings 35 and 36 for the cylindrical head 37 of a laterally extending screw bolt 38 passed through the spring carrier arm 12 and secured thereto by means of a nut 39.

The screw connections between rod 31 and the sleeves 29, 33 allow of the operative length of rod 31 being adjusted in accordance with local requirements.

When the device is properly adjusted, the spring 10 of the vehicle should in its normal position engage the center points of set screws 15, and also the locking member 19 along the generatrix having the minimum distance from the axis of said member so that rotation of member 19 in either direction will cause the spring leaves to be firmly pressed against one another between the eccentric portion of member 19 and the said center points.

The mode of operation of the described device will now be understood. Whenever, under the influence of unevenness of the road, the spring 10 flexes inward or outward, the distance between the spring carrier arm and the strap 13 is reduced or increased, whereby the locking member 19 is rotated through a certain angular distance in the one or the other direction and the leaves of spring 10 are pressed on one another with a force, the magnitude of which depends upon the deflexion of the spring. Consequently, the friction between the blades will be increased and the shock more or less completely absorbed.

It will be understood that the cross sectional shape of the eccentric portion of locking member 19 need not be exactly circular.

It may be so chosen that the clamping force exerted by the device is proportionate to, or progressive with the deflexion of the spring. Said eccentric portion may also, through only part of its circumference, be cylindrical and coaxial with the trunnions so that, after the clamping force has attained a given magnitude, it will not further be increased on further rotation of the locking member 19.

The strap 13 is so shaped as to have a certain amount of resiliency in vertical direction. This has the advantage that it is not necessary for the mechanism to be very exactly adjusted and for the eccentric member 19 to be exactly made to shape.

As shown in Fig. 4, the bearing bush 17 is a cylindrical sleeve having flat sides and provided with a collar $17^a$, the cross sectional form of said sleeve corresponding with that of the aperture in the left hand side shank of strap 13. The bearing bush 18 also is a cylindrical sleeve provided with collars $18^a$ and $18^b$, respectively, on either side thereof, collar $18^b$ and said sleeve having flat sides. The aperture in the right hand side shank of strap 13 has two straight edges, the distance between which is substantially equal to, but the length of which is somewhat greater than that between the flat sides of the collar $18^b$ and the sleeve part of bearing bush 18, its arcuate bottom edge corresponding with that of the cross section of the sleeve portion of bush 18. Now, when the locking member 19 is to be mounted in place, the bearing bush 17 is held in position intermediate between the shanks of strap 13 with collar $17^a$ facing the right hand shank, whereupon the member 19 is introduced through the aperture in the right hand shank and bush 17 is passed on its left hand side trunnion.

Thereupon the sleeve portion of bush 17 is passed through the aperture in the left hand side shank of strap 13 until collar $17^a$ engages the inner side of said shank. Owing to the resiliency of the strap, the member 19 can now easily be forced into a slightly upwardly inclined position, so that bush 18 can be slid over the right hand side trunnion until its collar $18^b$ has passed through the aperture in the right hand side shank of strap 13 and its sleeve portion is located within said aperture, whereupon a slight downward movement of member 19 brings the sleeve portion of bush 18 into engagement with the lower cylindrical wall of the aperture and collars $18^a$, $18^b$ lock bush 18 against lateral displacement.

What I claim is:

1. In a shock absorber for vehicles provided with leaf springs, the combination of a strap adapted to embrace a leaf spring, a locking member pivoted to the shanks of the strap and provided with an eccentric portion intermediate between the shanks, said eccentric portion being adapted to engage said spring, two set screws in said strap positioned on each side of a vertical plane through the axis of said locking member and engaging one side of said leaf spring, a crank connected to the locking member, and means for operatively coupling the free end of the crank with the sprung part of the vehicle.

2. In a shock absorber for vehicles provided with leaf springs, the combination of a strap adapted to embrace a leaf spring, a locking member pivoted to the shanks of the strap and provided with an eccentric portion intermediate between the shanks, said eccentric portion being adapted to engage the other side of the spring, two set screws in said strap positioned on each side of a vertical plane through the axis of said locking member and having hardened center points engaging one side of said leaf spring, a crank connected to the locking member, and means for operatively coupling the free end of the crank with the sprung part of the vehicle.

3. In a shock absorber for vehicles provided with leaf springs, the combination of a strap having a certain amount of resiliency in vertical direction and being adapted to embrace a leaf spring, a locking member pivoted to the shanks of the strap and provided with an eccentric portion intermediate between the shanks, said eccentric portion being adapted to engage said spring, two set screws threaded into said strap on each side of a vertical plane through the axis of said locking member and engaging one side of said leaf spring, a crank connected to the locking member, and means for operatively coupling the free end of the crank with the sprung part of the vehicle.

4. In a shock absorber for vehicles provided with leaf springs, the combination of a strap adapted to embrace a leaf spring, a locking member pivoted to the shanks of the strap and provided with an eccentric portion intermediate the shanks, said eccentric portion being adapted to engage said spring, two set screws in said strap positioned on each side of a vertical plane through the axis of said locking member and engaging one side of said leaf spring, a crank associated with the locking member, a rod of adjustable operative length having its one end flexibly coupled with said crank, and an element flexibly coupled with the other end of said rod and adapted to be secured to the sprung part of the vehicle.

5. In a shock absorber for vehicles provided with leaf springs, the combination of a strap adapted to embrace a leaf spring, non-circular apertures provided in each shank of said strap, the aperture in the one shank having greater vertical length than has the aperture in the other shank, a bearing bush snugly fitting in the aperture in the one shank and provided on the inner side with a collar, a second bearing bush fitting with relatively great vertical clearance in the aperture in the other shank and provided with a collar both on the inner and on the outer side, a locking member having trunnions fitting in said bearing bushes and provided with an eccentric portion intermediate between the shanks, said eccentric portion being adapted to engage said spring, a crank connected to the locking member, and means for operatively coupling the free end of the crank with the sprung part of the vehicle.

In testimony whereof I affix my signature.

HENRICUS FRANCISCUS JOZEF BERNAERTS.